United States Patent
Abe et al.

(10) Patent No.: US 8,019,149 B2
(45) Date of Patent: Sep. 13, 2011

(54) PATTERN SHAPE EVALUATION METHOD AND PATTERN SHAPE EVALUATION APPARATUS UTILIZING THE SAME

(75) Inventors: Hideaki Abe, Yokohama (JP); Tadashi Mitsui, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 29 days.

(21) Appl. No.: 12/562,173

(22) Filed: Sep. 18, 2009

(65) Prior Publication Data

US 2010/0128966 A1      May 27, 2010

(30) Foreign Application Priority Data

Nov. 25, 2008    (JP) ................................ 2008-299890

(51) Int. Cl.
*G06K 9/00* (2006.01)
*G01N 21/86* (2006.01)
(52) U.S. Cl. ............... 382/154; 250/559.36; 250/559.44
(58) Field of Classification Search .................. 382/112, 382/141, 144, 145, 165, 170, 181, 190, 199, 382/154, 201, 203; 330/4.9, 250, 299, 308; 332/102, 105, 110, 116, 130, 152, 135, 146, 332/164; 250/202, 550, 559.36, 559.44; 438/15, 25, 26
See application file for complete search history.

(56) References Cited

U.S. PATENT DOCUMENTS

| 5,987,173 | A | * | 11/1999 | Kohno et al. ................. 382/199 |
| 6,985,626 | B2 | * | 1/2006 | Mitsui ........................... 382/201 |
| 7,151,855 | B2 | | 12/2006 | Mitsui |

FOREIGN PATENT DOCUMENTS

| JP | 2001-34761 | 2/2001 |
| JP | 2002-281572 | 9/2002 |
| JP | 2004-117204 | 4/2004 |
| JP | 2007-248087 | 9/2007 |

* cited by examiner

*Primary Examiner* — Abolfazl Tabatabai
(74) *Attorney, Agent, or Firm* — Finnegan, Henderson, Farabow, Garrett & Dunner, L.L.P.

(57) ABSTRACT

A pattern shape evaluation method for deciding whether a pair of patterns are disconnected or connected. The method includes extracting a plurality of pattern contour points that make up a contour of a pattern in a measurement region, and creating two pattern contour point sequences based on the plurality of pattern contour points. Each of the two pattern contour point sequences includes a set of the pattern contour points. In the pattern contour point sequence, each of distances between neighboring pattern contour points is equal to or smaller than a predetermined value. The method includes calculating an angle between a line passing through two of the pattern contour points which provide a shortest distance between the two pattern contour point sequences and a reference line arbitrarily defined with respect to the measurement region. The method further includes deciding whether the patterns are disconnected or connected, based on the angle.

20 Claims, 7 Drawing Sheets

NON-DEFECTIVE PATTERN SHAPE

DEFECTIVE PATTERN SHAPE

NON-DEFECTIVE PATTERN SHAPE

DEFECTIVE PATTERN SHAPE

PATTERN SHAPE EVALUATION METHOD AND PATTERN SHAPE EVALUATION APPARATUS UTILIZING THE SAME

CROSS REFERENCE TO RELATED APPLICATION

This application is based upon and claims the benefit of priority from prior Japanese Patent Application No. 2008-299890, filed on Nov. 25, 2008, the entire contents of which are incorporated herein by reference.

BACKGROUND OF THE INVENTION

1. Field of the Invention

The present invention relates to a pattern shape evaluation method and a pattern shape evaluation apparatus utilizing the same and, for example, to a method for evaluating interconnection patterns or photo-resist patterns in a semiconductor device and a pattern shape evaluation apparatus utilizing the same.

2. Background Art

Recently, the patterns of a semiconductor device have been becoming finer ever increasingly, thus resulting in an increase in importance of the pattern shape evaluation. Further, in manufacturing of the semiconductor devices, it is necessary to accurately measure, evaluate, and control the dimensions not only of simple shapes such as line patterns and hole patterns but also of complicated shapes such as line end abutting patterns. Actually, there may be some cases where the patterns would be coupled between the line ends owing to influences such as variations in light exposure/focus value of an exposure machine and accuracies of optical proximity correction (OPC) in lithography process in which pattern is formed.

In general, to evaluate the pattern shapes of a semiconductor device, dimension measurement has been employed using a critical dimension scanning electron microscope (CD-SEM). However, this dimension measurement approach by use of the CDSEM will obtain only the distance between two points on the contour line of a pattern but is not able to decide whether the shape of the pattern is acceptable.

SUMMARY OF THE INVENTION

According to an aspect of the present invention, there is provided a pattern shape evaluation method for deciding whether a pair of patterns are disconnected or connected, comprising:

setting a measurement region in a predetermined region for an image data containing two patterns disconnected from each other or continuous one pattern;

extracting a plurality of pattern contour points that make up a contour of the disconnected two patterns or the continuous one pattern in the measurement region;

creating two pattern contour point sequences each of which is a set of the pattern contour points, and in the pattern contour point sequence, each of distances between neighboring ones of the pattern contour points is a predetermined value or less, based on the plurality of pattern contour points;

calculating an angle between a line passing through two of the pattern contour points which provide a shortest distance between the two pattern contour point sequences and a reference line arbitrarily defined with respect to the measurement region; and deciding whether the pair of patterns are disconnected or connected, based on the angle.

According to another aspect of the present invention, there is provided a pattern shape evaluation apparatus for deciding whether a pair of patterns are disconnected or connected, comprising:

an input device that has an interface with a pattern measurement apparatus that supplies an image data containing the pair of patterns;

a memory that stores an algorithm for evaluating the pair of patterns, a recipe file containing setting information of a measurement region, and the image data;

an image processing device that sets the measurement region based on the setting information of the measurement region stored in the memory, extracts a plurality of pattern contour points that make up a contour of the pair of patterns in the measurement region, and creates two pattern contour point sequences each of which is a set of the pattern contour points, and in the pattern contour point sequence, each of distances between neighboring ones of the pattern contour points is a predetermined value or less, based on the plurality of pattern contour points;

a workstation that stores into the memory the image data supplied from the pattern measurement apparatus via the input device, transfers the image data to the image processing device, calculates an angle between a line passing through two of the pattern contour points which provide a shortest distance between the two pattern contour point sequences and a reference line arbitrarily defined with respect to the measurement region, and decides whether the pair of patterns are disconnected or connected, based on the angle; and an output device that displays a result of the decision.

DESCRIPTION OF THE EMBODIMENTS

A description will be given of a pattern shape evaluation method according to two comparison examples (comparison examples 1 and 2) before describing embodiments of the present invention.

Figure 8A:
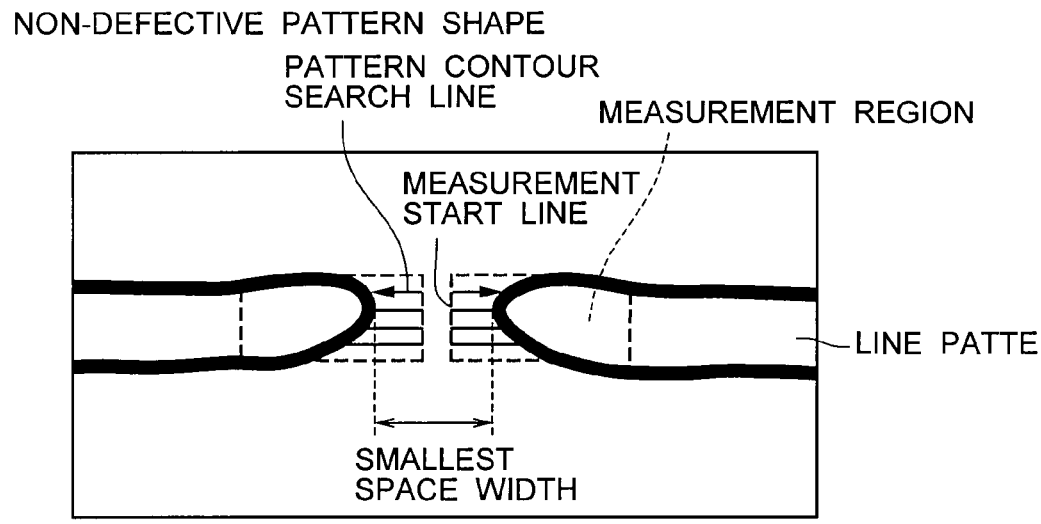
FIG. 8 is an explanatory diagram of the pattern shape evaluation method according to comparison example 1.
Figure 8B:
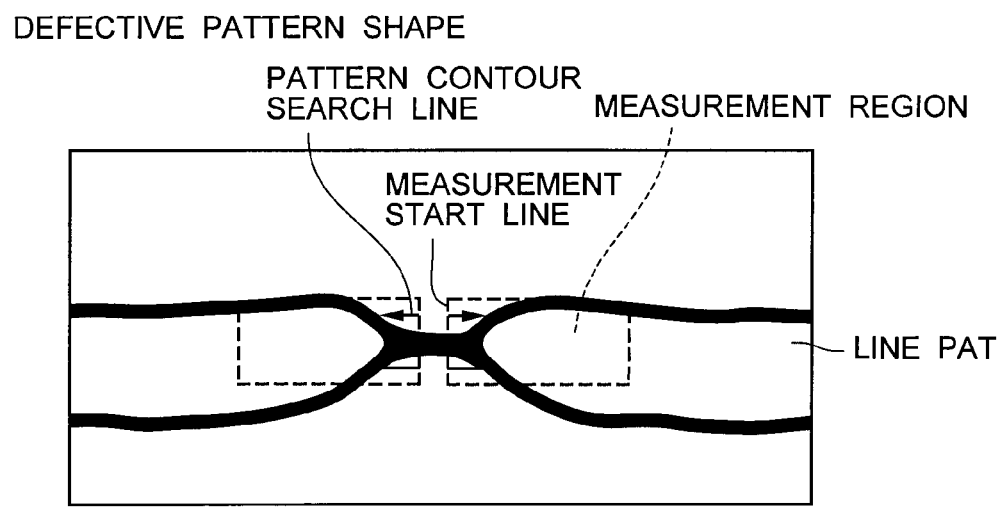

A description will be given of comparison example 1 with reference to FIG. 8. This FIG. 8 shows a line end abutting pattern in which two line patterns face each other. FIG. 8A shows a non-defective pattern shape and FIG. 8B shows a defective pattern shape in which the two line patterns are connected. The pattern shape evaluation method according to comparison example 1 goes along the following flow.

(1) First, as can be seen from FIGS. 8A and 8B, a region subject to pattern shape evaluation is set as a measurement region. This measurement region may be set on the basis of data of designing pattern shapes.

(2) Next, as can be seen from FIGS. 8A and 8B, a pattern contour search line is extended from a point on part (measurement start line) of an outer circumference of the measurement region in a predetermined direction (horizontally, here), thereby searching for a pattern contour. Then, a position (pattern contour coordinates) is found at which the pattern contour search line abuts the pattern contour.

(3) Next, the smallest space width between line ends is obtained on the basis of the pattern contour coordinates. If there is a connected pattern, the pattern contour search line goes parallel with the pattern contour at a portion of the connected pattern as can be seen from FIG. 8B. Therefore, the pattern contour at the portion of the connected pattern may not be extracted, thus resulting in a measurement error.

Figure 9A:
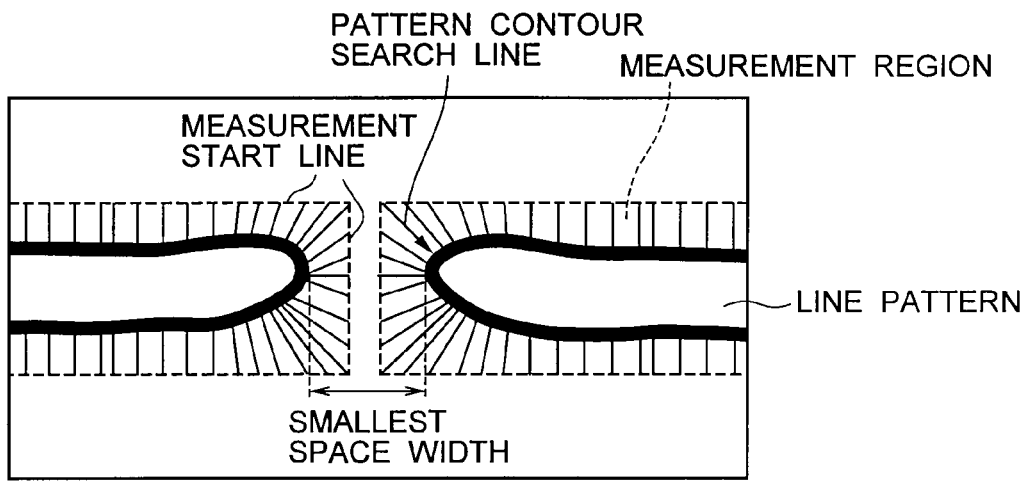
FIG. 9 is an explanatory diagram of the pattern shape evaluation method according to comparison example 2.
Figure 9B:
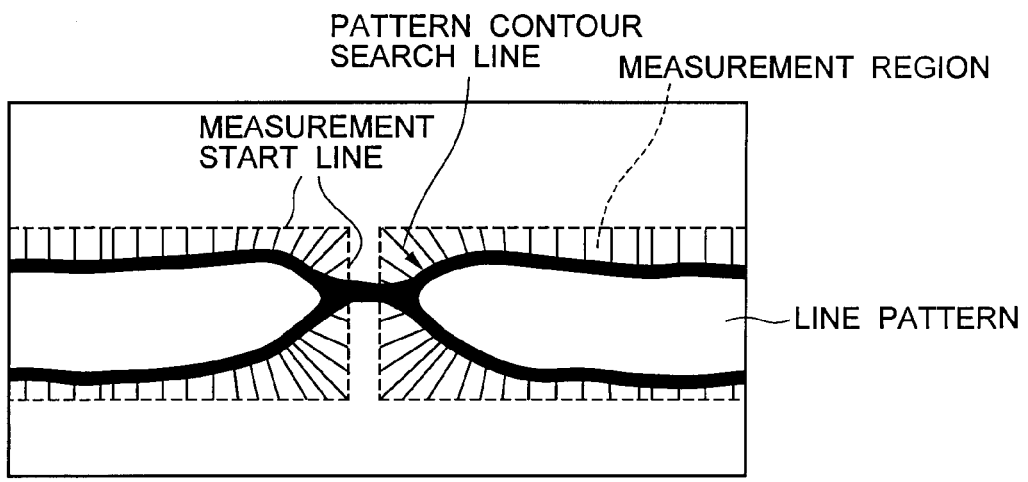

Next, a description will be given of comparison example 2 with reference to FIG. 9. This FIG. 9 shows a line end abutting pattern in which two line patterns face each other. FIG. 9A shows a non-defective pattern shape and FIG. 9B shows a defective pattern shape in which the two line patterns are connected. The pattern shape evaluation method according to comparison example 2 goes along the following flow.

(1) First, as can be seen from FIGS. 9A and 9B, a region subject to pattern shape evaluation is set as a measurement region.

This measurement region may be set on the basis of data of designing pattern shapes.

(2) Next, a pattern contour search line is extended from a point on part (measurement start line) of an outer circumference of the measurement region in all directions toward the inside of the measurement region, thereby searching for a pattern contour. Thus, a position of the pattern contour (pattern contour coordinates) is extracted, to calculate all the distances from the points on the outer circumference of the measurement region to the extracted pattern contour coordinates. Then, the shortest one is obtained from among the calculated distances. The thus obtained shortest distance is referred to as an edge placement error. The pattern contour search line in FIGS. 9A and 9B indicates the edge placement error. This edge placement error is used to obtain a difference between the design data and an actual pattern shape.

(3) Next, the smallest space width between line ends is obtained on the basis of this edge placement error.

If there is a connected pattern, as can be seen from FIG. 9B, like comparison example 1, the pattern contour at the portion of the connected pattern may not be extracted, thus resulting in a measurement error.

As thus described, comparison examples 1 and 2 are both able to obtain the smallest space width between line ends by searching for a pattern contour in the case of a non-defective pattern shape but, in the case of a defective pattern shape, result in a measurement error, so that no further details can be known.

It is to be noted that supposedly the pattern shape can be decided on whether it is non-defective or defective by using information of the measurement error. That is, supposedly, the pattern shape can be decided as being non-defective if there is no measurement error and vice versa. However, the measurement error may possibly occur in other cases than the pattern connecting. For example, the measurement error can occur if no pattern is formed at all or in the case of a simple mistake in measurement such as a mistake in setting of the measurement region. Accordingly, it is impossible to decide the pattern shape as being defective just because a measurement error has occurred. It is thus necessary to visually conform whether the pattern shape is defective or non-defective as to image data on which the measurement error has occurred. However, since mass-production of the semiconductor devices involves processing of a vast amount of image data, it may not be practical that the operator would visually check the image data pieces point by point.

The above description has proven that neither of the pattern shape evaluation methods according to comparison examples 1 and 2 is sufficiently effective at all.

It is to be noted that the actual degree of pattern connecting, if any so that the concerned pattern shape may be decided as being defective, changes variously with process conditions etc. For example, in the case of a slight degree of pattern connecting, the concerned connected pattern will be cut off at the subsequent etching process etc. so that it may be evaluated as a non-defective pattern shape finally. Accordingly, if the slight degrees of defective patterns can be evaluated as being non-defective, redoing can be avoided, thus improving the yield.

The present invention has been developed on the basis of the aforementioned independent recognition of the present inventors, by which a decision is made as to whether a pattern shape is defective or non-defective (for example, whether there is a connected/separated pattern) securely and, if it is defective, its degree of defectiveness is evaluated quantitatively. This results in highly accurate evaluation of the pattern shapes.

A description will be given below of the embodiments of the present invention with reference to the drawings. The first embodiment provides a pattern shape evaluation method. The second embodiment provides an apparatus which is used to conduct this evaluation method.

Identical reference numerals are given to identical components in the embodiments, and repetitive description on the identical components will not be repeated. Further, numerals in the description of the embodiments are all illustrative, and the present invention is not limited to them.

First Embodiment

Figure 1:
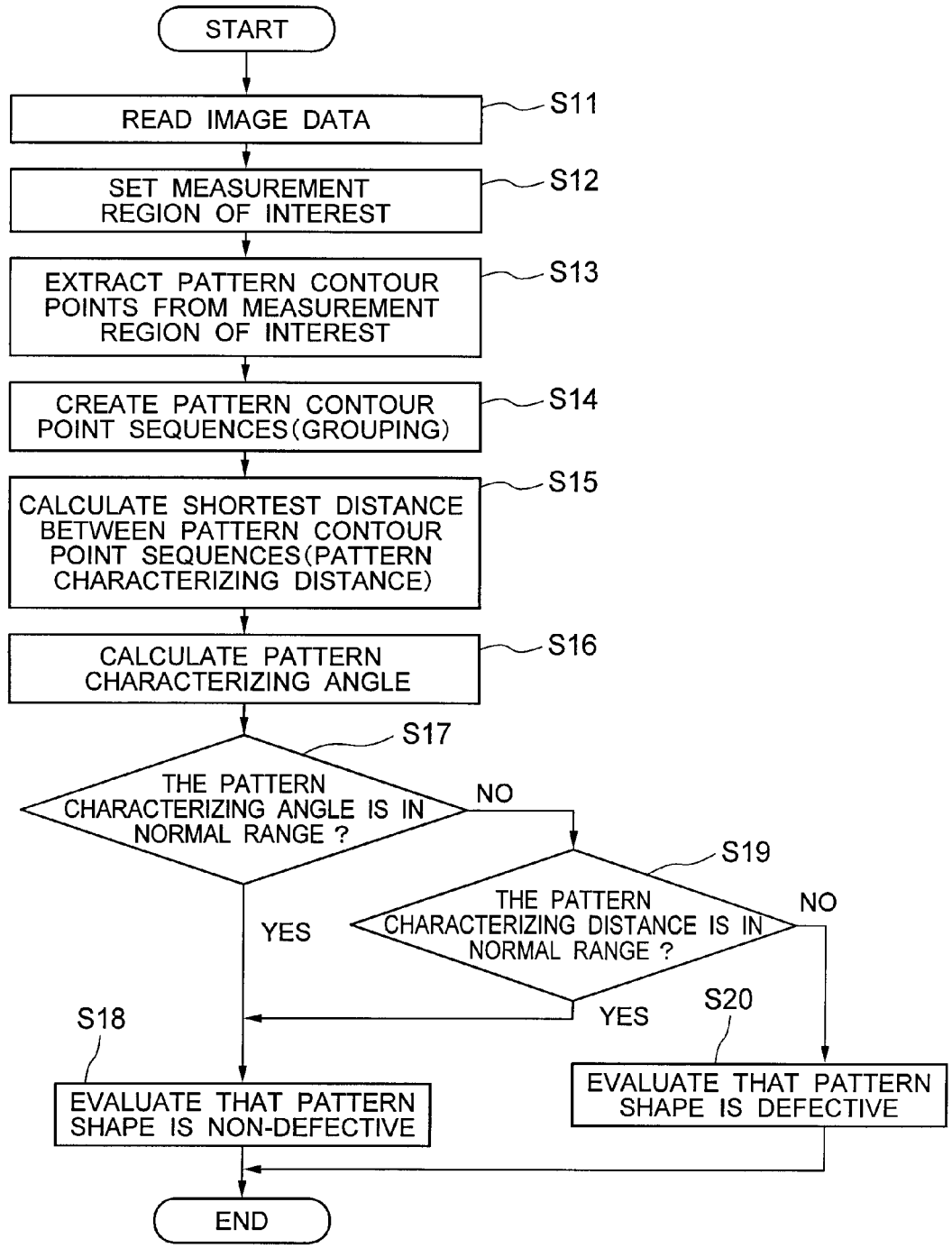
FIG. 1 is a flowchart showing a pattern shape evaluation method according to a first embodiment.
Figure 2A:
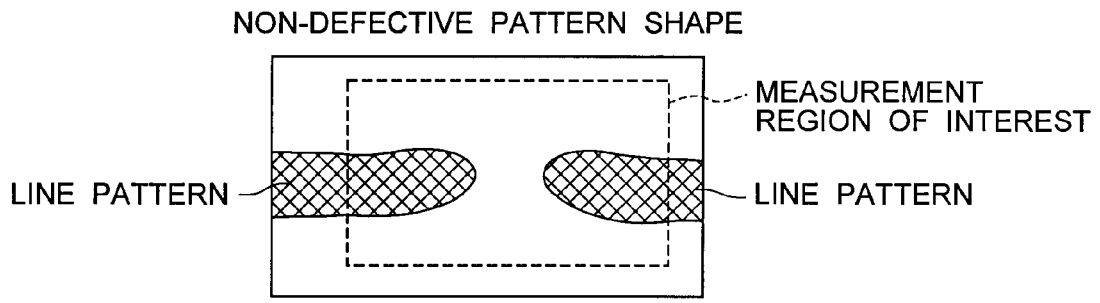
FIG. 2 is an explanatory diagram of the pattern shape evaluation method according to the first embodiment.
Figure 2B:
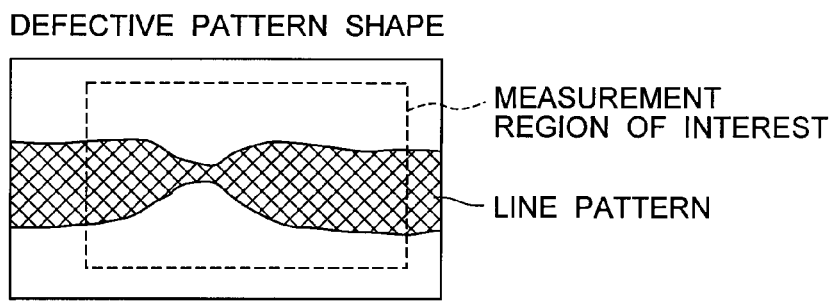

A description will be given of the first embodiment with reference to FIGS. 1 to 5. FIG. 1 shows a flowchart of a method according to the present embodiment. FIGS. 2 to 5 show images which are used to describe the present embodiment. Those images all show a line end abutting pattern for two line patterns extending horizontally. FIGS. 2A, 3A, 4A, and 5A show a non-defective pattern shape in which the line ends are separated from each other. On the other hand, FIGS. 2B, 3B, 4B, and 5B show a defective pattern shape (connected pattern) in which the line ends are coupled with each other.

A description will be given below of the pattern shape evaluation method according to the present embodiment along the flowchart of FIG. 1.

(1) First, image data containing a measurement pattern of interest is read (step S11). For example, a SEM image containing the measurement pattern of interest is acquired using a scanning electron microscope (SEM), to read data of this SEM image. As can be seen from FIG. 2, this measurement pattern of interest is a line end abutting pattern in which two line patterns face each other. This line pattern has a width of about 80 nm.

(2) Next, as shown in FIG. 2, a measurement region of interest (hereinafter referred to as ROI (region of interest)) is set in a predetermined region of the read image data (step S12).

(3) Next, as shown in FIG. 3, a plurality of pattern contour points are extracted which make up the contour of the measurement pattern of interest in the ROI thus set (step S13).

Since the shapes of patterns can change complicatedly, if a search direction for the pattern contour is determined beforehand, there is a possibility that the pattern contour points may not be extracted. Accordingly, a method is employed for searching for the pattern contour points without determining the search direction. To extract the pattern contour points, the following two methods are available, for example.

(i) Method for performing binarization processing on the read image data and then extracting the pattern contour points.

(ii) Method for preparing a profile of the information of gradation values in a direction roughly perpendicular to a pattern contour line as a template for cross-checking against the image data and then searching for a gradation profile proximate to this template, thereby extracting the pattern contour points.

Figure 10:
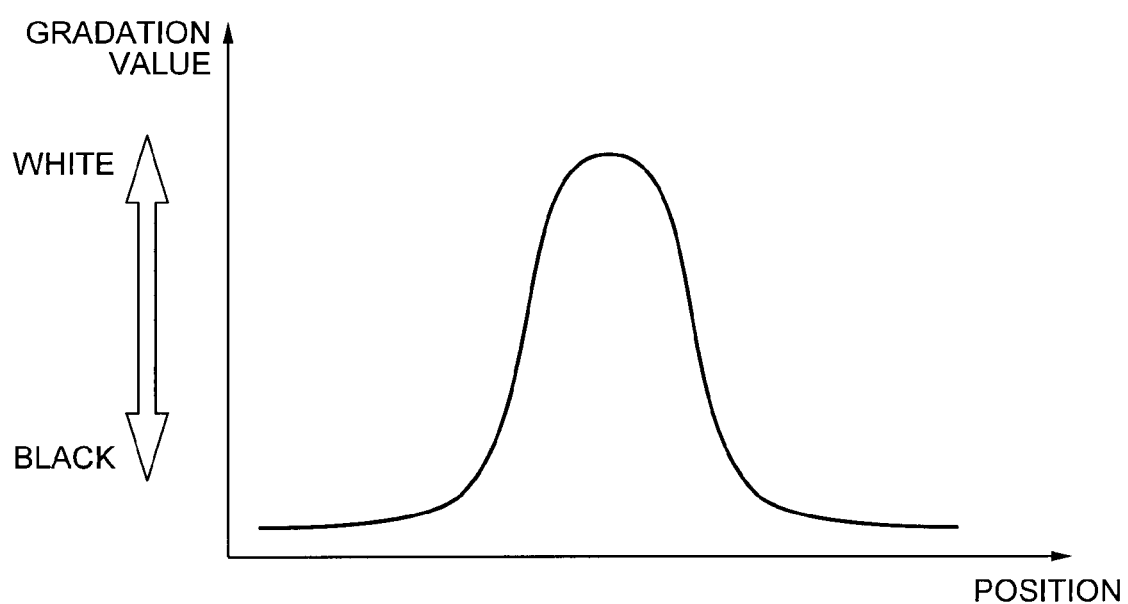
FIG. 10 is a graph showing one example of a template for searching for pattern contours.

The pattern contour point extraction method according to (ii) is effective in a case where the image data is acquired using a charged particle beam apparatus such as an SEM. This is because the SEM image appears nearly white along its pattern contour and nearly black at both ends of the pattern contour. Accordingly, by preparing such a gradation profile as shown in FIG. 10, for example, as a template, accuracy can be improved at which the pattern contour points are extracted.

(4) Next, based on a plurality of the extracted pattern contour points, two pattern contour point sequences are created (step S14).

The pattern contour point sequences are each a set of pattern contour points, in which distances between the neighboring pattern contour points are each a predetermined value or less. The pattern contour point sequences are created, for example, as follows. First, attention is focused on a certain pattern contour point, to calculate distances from this pattern contour point to all the other pattern contour points respectively. Then, a minimum value of the calculated distances is obtained. If the shortest distance is a predetermined value or less, that pattern contour point is included as a member of a pattern contour point sequence. This operation is performed on all the pattern contour points, thereby creating the pattern contour point sequence.

Figure 3A:
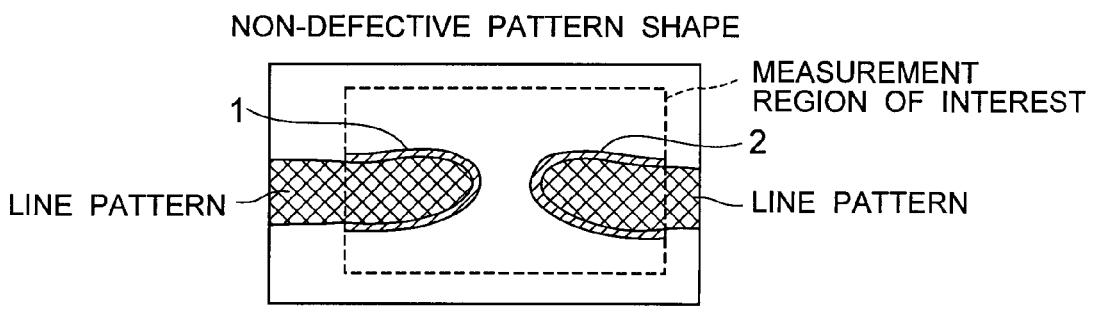
FIG. 3 is another explanatory diagram of the pattern shape evaluation method according to the first embodiment.

The thus created pattern contour point sequence is shown in FIG. 3. In the case of a non-defective pattern shape, pattern contour point sequences 1 and 2 which make up line end pattern contours are created as shown in FIG. 3A.

Figure 3B:
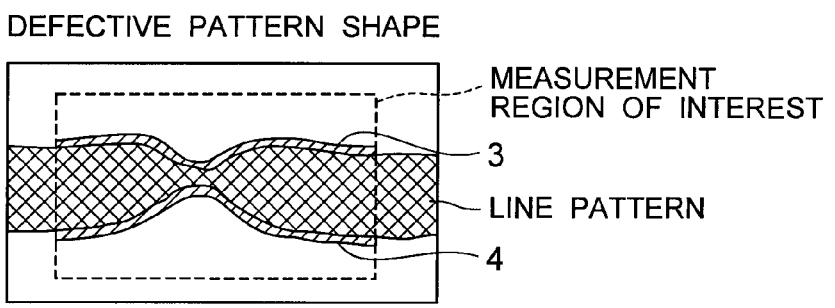

On the other hand, in the case of a defective pattern shape, as shown in FIG. 3B, the right and left line ends are coupled with each other to provide one line pattern, so that pattern contour point sequences 3 and 4 are created which make up pattern contours above and below this one line pattern respectively.

(5) Next, the shortest distance (hereinafter referred to as pattern characterizing distance) between the two pattern contour point sequences is calculated (step S15).

As one of the methods for calculating the pattern characterizing distance, a method is available for assuming all the combinations of the respective contour points of the two pattern contour point sequences, calculating the distance between the contour points in each of the combinations, and obtaining the minimum value of the thus obtained distances.

Figure 4A:
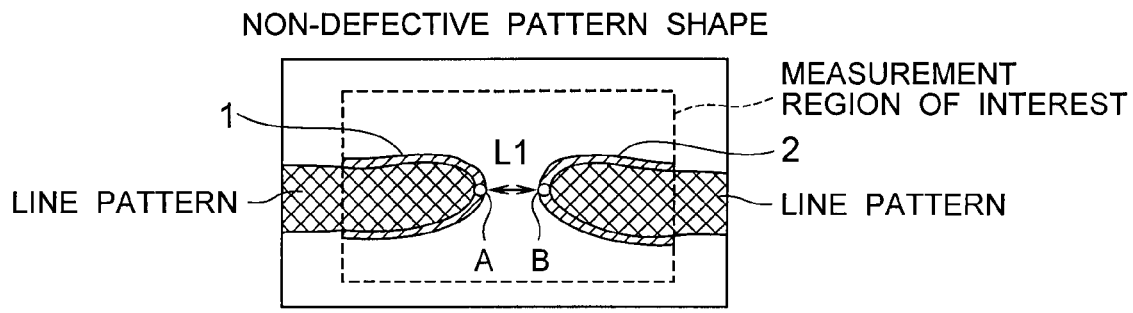
FIG. 4 is a further explanatory diagram of the pattern shape evaluation method according to the first embodiment.
Figure 4B:
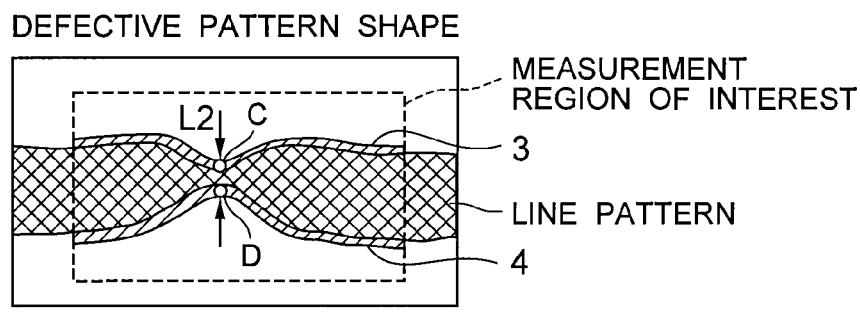

The pattern characterizing distance calculated in such a manner is shown in FIGS. 4A and 4B. FIG. 4A shows pattern characterizing distance L1 in a case where the pattern shape is non-defective. As can be seen from this FIG. 4A, pattern characterizing distance L1 is a distance between point A belonging to pattern contour point sequence 1 and point B belonging to pattern contour point sequence 2, thus providing the smallest space width between the line ends.

On the other hand, FIG. 4B shows pattern characterizing distance L2 in a case where the pattern shape is defective. As can be seen from this FIG. 4B, pattern characterizing distance L2 is a distance between point C belonging to pattern contour point sequence 3 and point D belonging to pattern contour point sequence 4, thus providing the minimum value of a width of the coupled pattern. That is, pattern characterizing distance L2 provides a quantified value of the degree of pattern connecting.

(6) Next, a pattern characterizing angle is calculated which is used to decide whether patterns are coupled with each other (step S16).

The pattern characterizing angle refers to an angle between a line passing through two points that define the pattern characterizing distance and the reference line. This angle will be described in more detail with reference to FIGS. 5A and 5B.

Figure 5A:
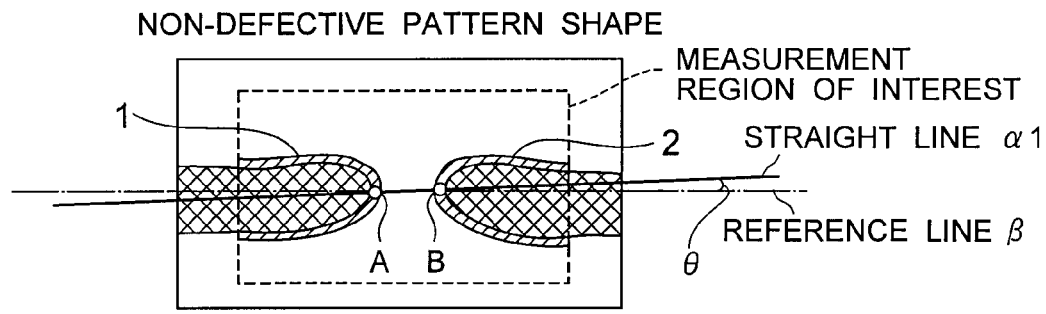
FIG. 5 is a still further explanatory diagram of the pattern shape evaluation method according to the first embodiment.

In a case where the pattern shape is non-defective, as shown in FIG. 5A, the angle is about 0° between line α1 passing through points A and B that give pattern characterizing distance L1 and the reference line β. That is, the pattern characterizing angle θ is about 0°. It is to be noted that the reference line β is a straight line that travels in the same direction as the line pattern, that is, horizontally in FIG. 5A.

Figure 5B:
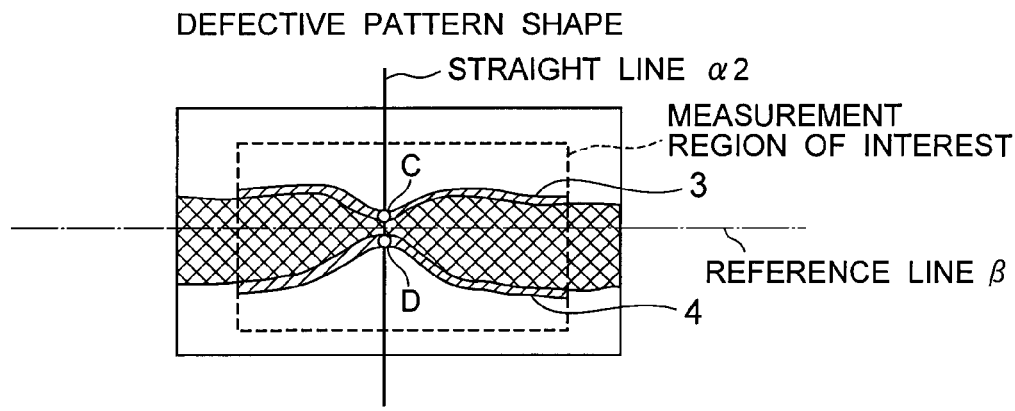

On the other hand, in a case where the pattern shape is defective, as shown in FIG. 5B, the angle is about 90° between line α2 passing through points C and D that give pattern characterizing distance L2 and the reference line β. That is, the pattern characterizing angle θ is about 90°.

At the subsequent steps, a decision is made as to whether the pattern shape is defective or non-defective by using the calculated pattern characterizing distance and pattern characterizing angle.

(7) A decision is made as to whether the pattern characterizing angle is in a normal range (step S17). If the pattern characterizing angle is $-60°<\theta<60°$, it is decided that the angle is in the normal range. If the angle is decided as being in the normal range, an advance is made to step S18 and, otherwise, an advance is made to step S19.

(8) If the pattern characterizing angle is decided as being in the normal range, the pattern shape of the ROI is evaluated as being non-defective (step S18).

(9) If the pattern characterizing angle is decided as not being in the normal range, then a decision is made as to whether the pattern characterizing distance is in a normal range (step S19). If the pattern characterizing distance is an allowable connection width (for example, 20 nm) or less, it is decided that the distance is in the normal range. If the pattern characterizing distance is larger than the allowable connection width, it is decided that the distance is not in the normal range. If the distance is decided as being in the normal range, an advance is made to step S18 and, otherwise, to step S20.

It is to be noted that this allowable connection width is determined by conditions under which the subsequent etching process is conducted. As one example, consider a photo-resist pattern formed on a conductive film. The photo-resist pattern is already formed into two line pattern shapes connected with each other by a photo-resist having the allowable connection width. The thickness of the photo-resist between the two line patterns is correlated with a pattern characterizing distance and, typically, smaller than that of the photo-resist of the line patterns. After the formation of such a photo-resist pattern, the conductive film is etched using this photo-resist pattern as a mask, to form an interconnection pattern.

During the etching, the photo-resist between the two line patterns is removed completely, so that the underlying conductive film is etched. On the other hand, the line pattern-shaped photo-resist is relatively thick and remains up to the last of the etching process. As a result, the conductive film is processed into a desired shape of the two line patterns. If the two line patterns are thus connected with each other as thin as not larger than an allowable connection width determined taking into account the subsequent processes, it is possible to decide at the present step of S19 that the distance is in the normal range.

(10) If it is decided that neither of the pattern characterizing angle and the pattern characterizing distance is in the normal range, the pattern shape of the ROI is evaluated as being defective (step S20).

In such a manner, according to the pattern shape evaluation method according to the present embodiment, a pattern characterizing angle and a pattern characterizing distance are obtained to then decide whether their values are in their respective preset ranges. First, by using the pattern characterizing angle, it is possible to securely decide whether the pattern shapes are connected. This eliminates the necessity of visual confirmation, which is indispensable in comparison examples 1 and 2. As a result, the inspection efficiency can be improved greatly.

Next, by using the pattern characterizing distance, it is possible to know the smallest space width in the case of the non-defective pattern shape, and even in the case of pattern connecting, the width of the connected portion can be known quantitatively. By thus evaluating the pattern shape quantitatively, accuracy can be improved at which a decision is made as to whether the pattern shape is defective or non-defective. It is thus possible to decide as being non-defective such a degree of pattern shape defectiveness that the concerned line ends may be separated from each other by the subsequent process. As a result, redoing can be avoided to improve the yield.

Further, in contrast to the comparison examples, the pattern shape evaluation method according to the present embodiment need not have design data for use in comparison to a measurement pattern. Therefore, it is unnecessary to prepare the design data beforehand, thus mitigating burdens on the operator and speeding up the processing of pattern shape evaluation.

Although the present embodiment has used 20 nm as the criterion for the pattern characterizing distances and $-60°<\theta<60°$ as the normal range of pattern characterizing angles, the present invention is not limited to those values. Those values can be set flexibly in accordance with the space width between line patterns and the processing conditions under which the processes are conducted.

Although the present embodiment has evaluated a measurement pattern of interest based on the pattern characterizing angle and the pattern characterizing distance, it is only necessary to make a decision by use of the pattern characterizing angle if only whether there is pattern connecting is to be evaluated.

Although the present embodiment has defined the reference line as a straight line which travels horizontally in FIGS. 5A and 5B like the reference line $\beta$, the present invention is not limited to it; it can be defined arbitrarily with respect to the ROI. For example, if the reference line is defined as being vertical, a decision can be made in essentially the same way as the present embodiment by defining the normal range of the pattern characterizing angle as being $-30°<\theta<30°$.

Further, instead of creating pattern contour point sequences, by creating a distance/angle distribution chart (DAD chart) described in Japanese Patent Application Laid-Open No. 2004-117204 (Japanese Patent Application No. 2002-281572), the pattern characterizing angle and the pattern characterizing distance may be calculated. In this case, the pattern characterizing angle will be calculated in the process of calculating the pattern characterizing distance.

Further, what is evaluated in the present embodiment is not limited to interconnection patterns but may be semiconductor patterns or insulator patterns such as photo-resist patterns.

Although the present embodiment has been described with reference to defectiveness of pattern connecting, by inversely applying the aforementioned criterion, a decision can be made as to whether the pattern shape is defective or not about such defectiveness that patterns which should be coupled with each other may be separated from each other.

Although the present embodiment has used image data acquired with the SEM device, the method according to the present embodiment may be conducted using image data acquired with any other devices, for example, an optical device such as a digital camera or a scanner.

Figure 6:
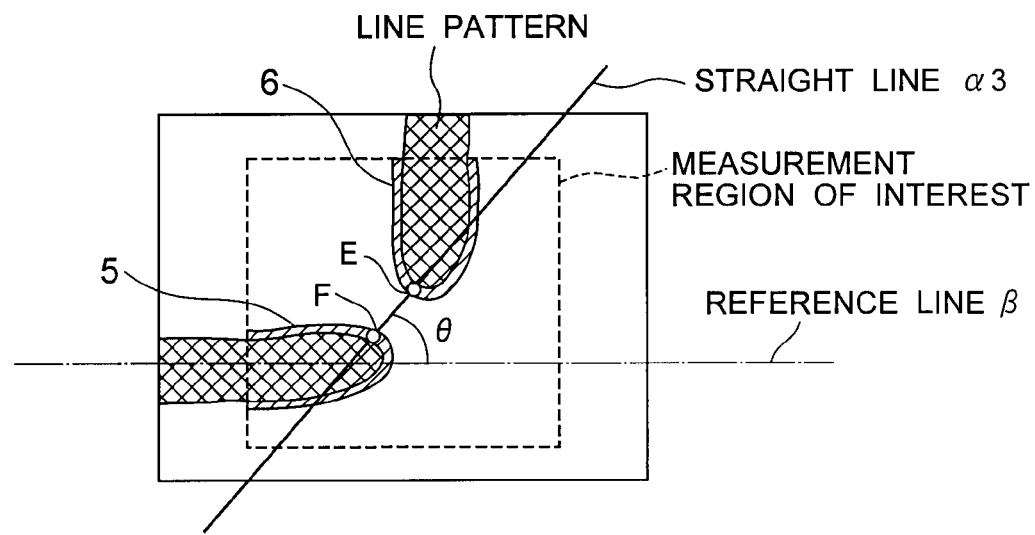
FIG. 6 is an explanatory diagram of a variant of the first embodiment.

Although the two line patterns have been placed on the same straight line (reference line) in the above description, the present embodiment is not limited to it and can be applied also to a case where the line patterns face each other at an arbitrary angle. For example, FIG. 6 shows a case where the two line patterns face each other at an angle of 90°. It is here assumed that points E and F belong to pattern contour point sequences 5 and 6 respectively and a distance between points E and F gives the shortest distances between pattern contour point sequences 5 and 6. Straight line α3 passes through points E and F and intersects the reference line $\beta$ at angle $\theta$. That is, $\theta$ is a pattern characterizing angle. In this example, a decision can be made as to whether pattern shapes are defective or not by assuming the pattern characterizing angle normal range to be $45°\pm x$ (x is, for example, 60°. More commonly, in the case of deciding whether two line patterns facing each other at angle $\Theta$ are defective or not, the pattern shape can be decided as to whether it is defective or not by assuming $\Theta/2$ to be the reference angle and deciding whether the pattern characterizing angle is in a predetermined range with respect to this reference angle. That is, if $\Theta/2-x<\theta<\Theta/2+x$ (x is a value indicating an allowable range of $\theta$, taking on, for example, 60°), the two line patterns are decided as being non-defective (disconnected from each other) and, otherwise, as being defective (connected).

As thus described, according to the present embodiment, a decision can be made securely as to whether measurement patterns of interest are connected with or disconnected from each other. This eliminates the necessity of visual confirmation on pattern shapes, thus enabling improving the inspection efficiency.

Moreover, the pattern shapes can be evaluated quantitatively. This enables improving accuracy at which the pattern shapes are decided as to whether they are defective or not, so that comparatively slight degrees of defective patterns can be decided as being non-defective. As a result, the yield can be improved.

Second Embodiment

Figure 7:
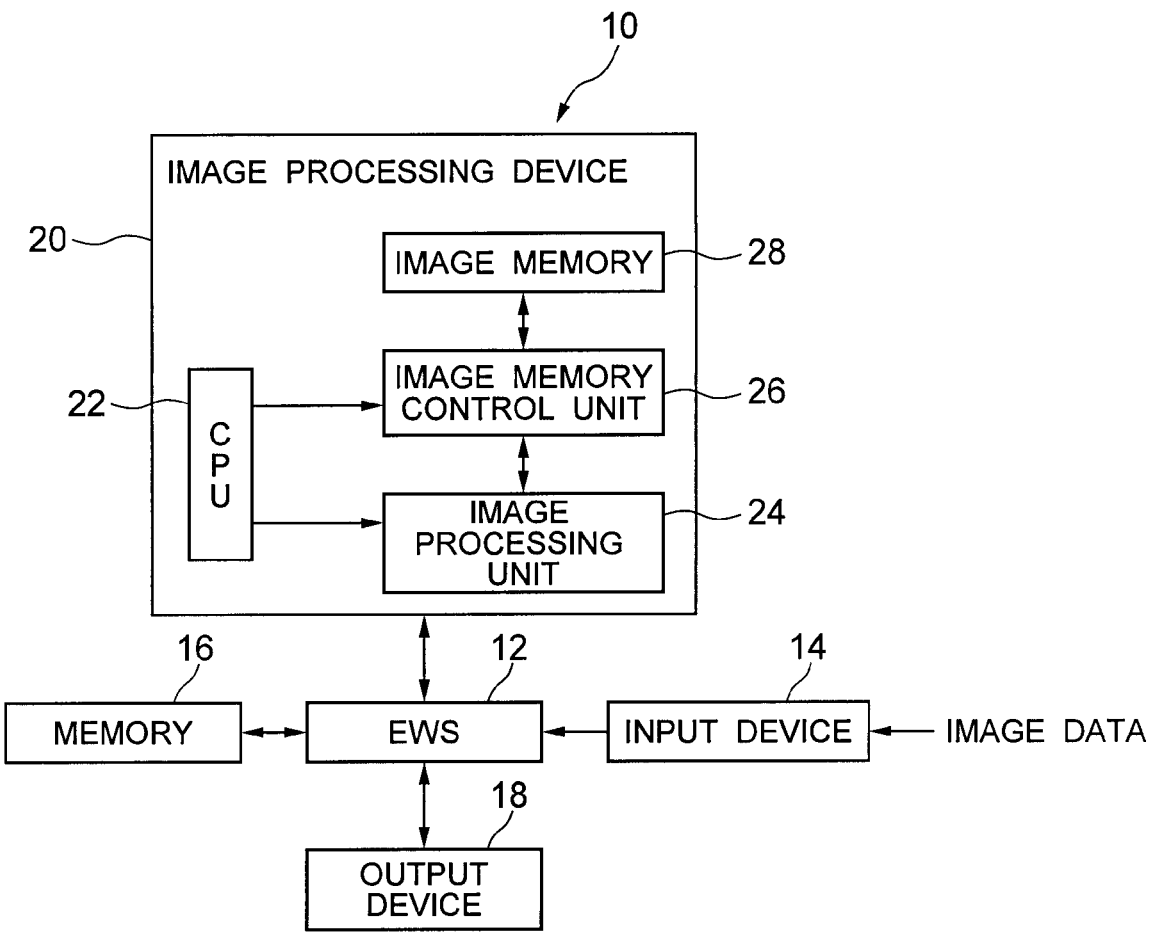
FIG. 7 is a block diagram of a pattern shape evaluation apparatus according to a second embodiment.

Next, a description will be given of the second embodiment. FIG. 7 is a block diagram of a pattern shape evaluation apparatus according to the present embodiment. A pattern shape evaluation apparatus 10 shown in this FIG. 7 includes a workstation (EWS) 12, an input device 14, a memory 16, an output device 18, and an image processing device 20.

The input device 14 comes in input means such as a keyboard or a mouse and has an interface with an external pattern measurement apparatus (for example, CDSEM). The input device 14 supplies the workstation 12 with the values of normal ranges of the pattern characterizing angle and pattern characterizing distance input by the operator using the input means.

The memory 16 stores an algorithm for pattern shape evaluation method, a recipe file containing setting information of an ROI, image data supplied from the pattern measurement apparatus, etc.

The workstation 12 reads the recipe file from the memory 16 and operates in accordance with the recipe file. Besides, it calculates the pattern characterizing angle and pattern characterizing distance and performs various types of processing to be described later such as a decision on whether pattern shapes are defective or not.

The output device 18 displays the results of decision on defectiveness/non-defectiveness of pattern shapes. This output device 18 is, for example, a display or a printer.

The image processing device 20 has a CPU22, an image processing unit 24, an image memory control unit 26, and an image memory 28 as shown in FIG. 7.

The image processing unit 24 performs image processing such as setting of an ROI, extraction of pattern contours from the ROI, and creation of pattern contour point sequences.

The image memory 28 temporarily retains image data being processed by the image processing unit 24.

The image memory control unit 26 conducts control on reading/writing of image data to the image memory 28.

The CPU22 controls the image processing unit 24 and the image memory control unit 26 in accordance with instructions from the workstation 12.

Next, a description will be given of operations of this pattern shape evaluation apparatus 10.

(1) The workstation 12 stores into the memory 16 image data acquired from the input device 14 connected to the CDSEM.

(2) Next, the workstation 12 transfers the image data stored in the memory 16 to the image processing device 20. The transferred image data is stored into the image memory 28 of the image processing device 20.

(3) Next, the image processing device 20 reads the ROI setting information from the recipe file stored in the memory 16, via the workstation 12.

(4) Next, the image processing unit 24 in the image processing device 20 sets an ROI for the image data stored in the image memory 28, based on the read ROI setting information.

(5) Next, the image processing unit 24 extracts a pattern contour from the image data set for the ROI and stores data of the extracted pattern contour (pattern contour coordinates) into the image memory 28.

It is to be noted that in the case of carrying out the pattern profile extraction method by use of a template described with the first embodiment, the template stored in the memory 16 is copied into the image memory 28 beforehand, so that then the image processing unit 24 conducts gradation processing on the image data and cross-checks the template and the gradated image data against each other.

(6) Next, the image processing unit 24 creates a pattern contour point sequence based on the pattern contour coordinates stored in the image memory 28 and stores data of the created pattern contour point sequence into the image memory 28.

(7) Next, the image processing device 20 transfers the pattern contour point sequence data stored in the image memory 28 to the workstation 12.

(8) Next, the workstation 12 calculates the aforementioned pattern characterizing distance and pattern characterizing angle based on the transferred pattern contour point sequence data.

(9) Next, the workstation 12 decides whether the calculated pattern characterizing angle is in a normal range. If the pattern characterizing angle is decided as being in the normal range, the output device 18 outputs onto the display an indication to the effect that the concerned pattern shape is decided as being non-defective, preferably together with an identification symbol such as a file name of the image data. On the other hand, if the pattern characterizing angle is decided as not being in the normal range, the workstation 12 decides whether the calculated pattern characterizing distance is in a normal range. If the pattern characterizing distance is decided as being in the normal range, the output device 18 outputs onto the display an indication to the effect that the concerned pattern shape is decided as being non-defective, together with the identification symbol such as the file name of the image data. On the other hand, if the pattern characterizing distance is decided as not being in the normal range, the output device 18 outputs onto the display an indication to the effect that the concerned pattern shape is decided as being defective, together with the identification symbol such as the file name of the image data.

It is to be noted that when providing the information onto the display, the image, the pattern characterizing distance, and the pattern characterizing angle may be output together with the identification symbol such as the file name of the image data. Further, it may be arranged that whether to display various types of information such as the file name, the image, the pattern characterizing distance, and the pattern characterizing angle can be changed arbitrarily by setting. Those various types of information may be output only about those that the pattern shape is decided as being defective.

Further, the workstation 12 may use values stored in the memory 16 beforehand as the value of the pattern characterizing angle or the values of the normal ranges of the pattern characterizing distance and the pattern characterizing angle or it may use values input by the operator using the input device 14.

As described above, according to the present embodiment, there is provided the apparatus that conducts the pattern shape evaluation method according to the first embodiment.

Additional advantages and modifications will readily occur to those skilled in the art.

Therefore, the invention in its broader aspects is not limited to the specific details and representative embodiments shown and described herein.

Accordingly, various modifications may be made without departing from the spirit or scope of the general inventive concepts as defined by the appended claims and their equivalents.

What is claimed is:

1. A pattern shape evaluation method for deciding whether a pair of patterns are disconnected or connected, comprising:

setting, by an image processing device, a measurement region in a predetermined region for an image data containing two patterns disconnected from each other or continuous one pattern;

extracting, by the image processing device, a plurality of pattern contour points that make up a contour of the disconnected two patterns or the continuous one pattern in the measurement region;

creating, by the image processing device, two pattern contour point sequences each of which is a set of the pattern contour points, and in the pattern contour point sequence, each of distances between neighboring ones of the pattern contour points is a predetermined value or less, based on the plurality of pattern contour points;

calculating, by the image processing device, an angle between a line passing through two of the pattern contour points which provide a shortest distance between the two pattern contour point sequences and a reference line arbitrarily defined with respect to the measurement region; and deciding, by the image processing device, whether the pair of patterns are disconnected or connected, based on the angle.

2. The pattern shape evaluation method of claim 1, wherein:

the pair of patterns travel in a first direction;

the reference line is a straight line that travels along the first direction; and if an absolute value of the angle is smaller than a predetermined angle, the pair of patterns are decided as being disconnected from each other and, otherwise, decided as being connected with each other.

3. The pattern shape evaluation method of claim 2, wherein the predetermined angle is 60°.

4. The pattern shape evaluation method of claim 2, comprising:

calculating, by the image processing device, the shortest distance between the two pattern contour point sequences; and if the shortest distance is an allowable connection width or less, deciding that the pair of patterns are disconnected from each other, irrespective of the angle.

5. The pattern shape evaluation method of claim 2, comprising:

preparing, by the image processing device, a profile of gradation value information about a direction that intersects a contour line of the pair of patterns beforehand as a template for cross-checking against the image data; and searching, by the image processing device, the measurement region for a gradation profile proximate to the template, thereby extracting the pattern contour points.

6. The pattern shape evaluation method of claim 2, wherein the pair of patterns are interconnection patterns, semiconductor patterns, or photo-resist patterns.

7. The pattern shape evaluation method of claim 1, wherein:

one of the pair of patterns travels in the first direction and the other faces the one pattern at a certain opposed angle;

the reference line is the straight line traveling along the first direction; and if the angle satisfies a relationship of $\Theta/2-x<\theta<\Theta/2+x$, the pair of patterns are decided as being disconnected from each other and, otherwise, as being connected with each other, where $\theta$ is the angle, $\Theta$ is the opposed angle, and x is a value indicating an allowable range of the angle.

8. The pattern shape evaluation method of claim 7, wherein the opposed angle of $\Theta$ is 90° and the value of x is 60°.

9. The pattern shape evaluation method of claim 7, comprising:

calculating, by the image processing device, the shortest distance between the two pattern contour point sequences; and if the shortest distance is the allowable connection width or less, deciding that the pair of patterns are disconnected from each other, irrespective of the angle.

10. The pattern shape evaluation method of claim 7, comprising:

preparing, by the image processing device, the profile of the gradation value information about the direction that intersects the contour line of the pair of patterns beforehand as the template for cross-checking against the image data; and searching, by the image processing device, the measurement region for the gradation profile proximate to the template, thereby extracting the pattern contour points.

11. The pattern shape evaluation method of claim 7, wherein the pair of patterns are the interconnection patterns, the semiconductor patterns, or the photo-resist patterns.

12. The pattern shape evaluation method of claim 1, comprising:

calculating, by the image processing device, the shortest distance between the two pattern contour point sequences; and if the shortest distance is the allowable connection width or less, deciding that the pair of patterns are disconnected from each other, irrespective of the angle.

13. The pattern shape evaluation method of claim 12, comprising:

preparing, by the image processing device, the profile of the gradation value information about the direction that intersects the contour line of the pair of patterns beforehand as the template for cross-checking against the image data; and searching, by the image processing device, the measurement region for the gradation profile proximate to the template, thereby extracting the pattern contour points.

14. The pattern shape evaluation method of claim 12, wherein the pair of patterns are the interconnection patterns, the semiconductor patterns, or the photo-resist patterns.

15. The pattern shape evaluation method of claim 1, wherein the pair of patterns are the interconnection patterns, the semiconductor patterns, or the photo-resist patterns.

16. A pattern shape evaluation apparatus for deciding whether a pair of patterns are disconnected or connected, comprising:

an input device that has an interface with a pattern measurement apparatus that supplies an image data containing the pair of patterns;

a memory that stores an algorithm for evaluating the pair of patterns, a recipe file containing setting information of a measurement region, and the image data;

an image processing device that sets the measurement region based on the setting information of the measurement region stored in the memory, extracts a plurality of pattern contour points that make up a contour of the pair of patterns in the measurement region, and creates two pattern contour point sequences each of which is a set of the pattern contour points, and in the pattern contour point sequence, each of distances between neighboring ones of the pattern contour points is a predetermined value or less, based on the plurality of pattern contour points;

a workstation that stores into the memory the image data supplied from the pattern measurement apparatus via the input device, transfers the image data to the image processing device, calculates an angle between a line passing through two of the pattern contour points which provide a shortest distance between the two pattern contour point sequences and a reference line arbitrarily defined with respect to the measurement region, and decides whether the pair of patterns are disconnected or connected, based on the angle; and an output device that displays a result of the decision.

17. The pattern shape evaluation apparatus of claim 16, wherein the workstation calculates the shortest distance between the two pattern contour point sequences and, if the shortest distance is a predetermined value or less, decides that the pair of patterns are disconnected from each other, irrespective of the angle.

18. The pattern shape evaluation apparatus of claim 16, wherein:

the input device supplies the workstation with a value of a normal range of the angle input to the input device; and the workstation makes the decision on the pair of patterns by using the value of the normal range of the angle supplied from the input device.

19. The pattern shape evaluation apparatus of claim 16, wherein:

the memory stores the value of the normal range of the angle; and the workstation makes the decision on the pair of patterns by using the value of the normal range of the angle supplied from the memory.

20. The pattern shape evaluation apparatus of claim 16, wherein the output device displays at least any one of an identification symbol of the image data, an image of the pair of patterns, the shortest distance, and the angle, together with a result of the decision.

* * * * *